(12) United States Patent
Oyama et al.

(10) Patent No.: US 11,434,981 B2
(45) Date of Patent: Sep. 6, 2022

(54) WORK VEHICLE

(71) Applicant: Kubota Corporation, Osaka (JP)

(72) Inventors: Yoshinori Oyama, Sakai (JP); Yusuke Morita, Sakai (JP); Toshiki Ono, Sakai (JP)

(73) Assignee: Kubota Corporation, Osaka (JP)

( * ) Notice: Subject to any disclaimer, the term of this patent is extended or adjusted under 35 U.S.C. 154(b) by 274 days.

(21) Appl. No.: 16/896,395

(22) Filed: Jun. 9, 2020

(65) Prior Publication Data

US 2021/0079985 A1 Mar. 18, 2021

(30) Foreign Application Priority Data

Sep. 18, 2019 (JP) .............................. JP2019-169568

(51) Int. Cl.
| | | |
|---|---|---|
| B60K 11/06 | (2006.01) | |
| F16H 9/12 | (2006.01) | |
| B60K 13/02 | (2006.01) | |
| B60K 13/04 | (2006.01) | |
| B60K 11/02 | (2006.01) | |

(Continued)

(52) U.S. Cl.
CPC ................ *F16H 9/12* (2013.01); *B60K 11/02* (2013.01); *B60K 11/06* (2013.01); *B60K 11/08* (2013.01); *B60K 13/02* (2013.01); *B60K 13/04* (2013.01); *B60K 17/00* (2013.01); *F02B 29/0456* (2013.01); *F02P 3/02* (2013.01); *F16H 57/035* (2013.01); *F16H 57/048* (2013.01); *F16H 57/0416* (2013.01); *B62D 49/00* (2013.01)

(58) Field of Classification Search
CPC ...... F16H 9/12; F16H 57/035; F16H 57/0416; F16H 57/048; B60K 11/02; B60K 11/06; B60K 11/08; B60K 13/02; B60K 13/04; B60K 17/00; F02B 29/0456; F02P 3/02
See application file for complete search history.

(56) References Cited

U.S. PATENT DOCUMENTS 4,401,093 A * 8/1983 Gates, Jr. ........... F01M 13/0405
123/573
8,499,870 B2 * 8/2013 Nakamura ........... F02M 35/048
180/68.3

(Continued)

FOREIGN PATENT DOCUMENTS

| JP | 201251505 A | 3/2012 |
|---|---|---|
| JP | 2017105329 A | 6/2017 |

*Primary Examiner* — Jacob B Meyer
(74) *Attorney, Agent, or Firm* — The Webb Law Firm (57) ABSTRACT

A work vehicle includes an engine and a belt-type continuously variable transmission device provided on a lateral side of the engine and configured to (i) receive power from the engine and (ii) output the power to a traveling device while varying the power in terms of speed. The belt-type continuously variable transmission device has (i) an intake port which is present in the transmission device case and through which cooling air is sucked from outside the transmission device case into the transmission device case as a result of rotation of the rotary fan and (ii) a first exhaust port which is present in the transmission device case and through which the cooling air is discharged from inside the transmission device case as a result of the rotation of the rotary fan. The first exhaust port is present on a side of the exhaust pipe on which side the engine is present, and faces the engine.

8 Claims, 6 Drawing Sheets

(51) Int. Cl.
  *B60K 11/08* (2006.01)
  *F16H 57/035* (2012.01)
  *F16H 57/04* (2010.01)
  *F02P 3/02* (2006.01)
  *F02B 29/04* (2006.01)
  *B60K 17/00* (2006.01)
  *B62D 49/00* (2006.01)

(56) References Cited

U.S. PATENT DOCUMENTS

| | | |
|---|---|---|
| 8,776,939 B2 * | 7/2014 | Kuramoto ............... B60K 5/02 |
| | | 180/300 |
| 10,099,547 B2 | 10/2018 | Bessho et al. |
| 10,124,659 B2 * | 11/2018 | Bessho ................. B60K 13/04 |
| 10,232,699 B2 * | 3/2019 | Oyama .................. B60K 6/26 |
| 10,538,157 B2 * | 1/2020 | Oyama ................ B60K 17/354 |
| 2012/0055729 A1 * | 3/2012 | Bessho ................... B60K 5/04 |
| | | 180/309 |
| 2012/0138379 A1 * | 6/2012 | Tsuji ...................... B60K 11/04 |
| | | 180/309 |
| 2014/0113766 A1 * | 4/2014 | Yagyu .................. B60W 10/04 |
| | | 903/902 |
| 2017/0001508 A1 | 1/2017 | Bessho et al. |
| 2017/0001549 A1 * | 1/2017 | Bessho .................. B60L 53/80 |
| 2017/0174069 A1 * | 6/2017 | Oyama ................. B60R 21/131 |
| 2018/0105032 A1 * | 4/2018 | Oyama ................... B60K 1/04 |
| 2021/0079985 A1 * | 3/2021 | Oyama ................. B60K 17/00 |

\* cited by examiner

WORK VEHICLE

CROSS REFERENCE TO RELATED APPLICATION

This application claims priority to Japanese Patent Application No. 2019-169568 filed Sep. 18, 2019, the disclosure of which is hereby incorporated by reference in its entirety.

BACKGROUND OF THE INVENTION

1. Field of the Invention

The present invention relates to a work vehicle.

2. Description of the Related Art

An example work vehicle is a multipurpose vehicle disclosed in JP 2017-105329 A. The multipurpose vehicle includes an engine, a belt-type continuously variable transmission device provided on a lateral side of the engine and configured to (i) receive power from the engine and (ii) output the power to a traveling device while varying the power, and an exhaust pipe extending in the front-rear direction above the belt-type continuously variable transmission device and configured to discharge exhaust gas from the engine.

The above-described belt-type continuously variable transmission device for a work vehicle may include a transmission device case containing belt pulleys and an endless belt wound around each of the belt pulleys, a rotary fan provided inside the transmission device case, and an intake port which is present in the transmission device case and through which cooling air is sucked from outside the transmission device case into the transmission device case as a result of rotation of the rotary fan, so that the cooling air sucked into the transmission device case can cool the belt-type continuously variable transmission device.

An example of the above type of work vehicle is a work vehicle disclosed in JP 2012-51505 A. This work vehicle includes a kind of the belt-type continuously variable transmission device. This belt-type continuously variable transmission device includes (i) a transmission device case, (ii) an intake fin as the rotary fan, and (iii) a cooling air inlet as the intake port.

A work vehicle including the above-described belt-type continuously variable transmission device is arranged to suck cooling air into the transmission device case, cool the belt-type continuously variable transmission device with the cooling air, and then discharge the cooling air from the transmission device case. This has led to a demand for utilizing cooling air discharged from the transmission device case to cool the engine for a simplified engine cooling structure.

There is, in other words, a demand for a work vehicle capable of cooling the engine efficiently with use of cooling air discharged from the belt-type continuously variable transmission device. In view of that, the present disclosure proposes a work vehicle arranged as below.

SUMMARY OF THE INVENTION

A work vehicle, comprising:
an engine;
a belt-type continuously variable transmission device provided on a lateral side of the engine and configured to (i) receive power from the engine and (ii) output the power to a traveling device while varying the power in terms of speed, the belt-type continuously variable transmission device including:
a transmission device case containing a belt pulley and an endless belt wound around the belt pulley;
a rotary fan provided inside the transmission device case;
an intake port which is present in the transmission device case and through which cooling air is sucked from outside the transmission device case into the transmission device case as a result of rotation of the rotary fan; and
a first exhaust port which is present in the transmission device case and through which the cooling air is discharged from inside the transmission device case as a result of the rotation of the rotary fan; and
an exhaust pipe extending in a front-rear direction above the belt-type continuously variable transmission device and configured to discharge exhaust gas from the engine,
wherein the first exhaust port is present on a side of the exhaust pipe on which side the engine is present, and faces the engine.

This arrangement allows cooling air discharged from the inside of the transmission device case to reach the engine without becoming heated by the exhaust pipe and thereby cool the engine. This in turn allows cooling air discharged from the belt-type continuously variable transmission device to cool the engine efficiently.

An embodiment is arranged such that the first exhaust port faces a lateral side portion of the engine.

This arrangement allows cooling air discharged through the first exhaust port to easily reach the engine. This in turn allows cooling air discharged from the belt-type continuously variable transmission device to cool the engine more efficiently.

As an embodiment, the work vehicle further comprises
an air supply device connected with a rear portion of the engine and configured to supply combustion air to the engine,
wherein the first exhaust port faces a lateral side portion of the air supply device.

This arrangement allows cooling air discharged through the first exhaust port to reach the air supply device and thereby cool the air supply device. This in turn provides a simple cooling structure that utilizes cooling air discharged from the belt-type continuously variable transmission device to cool combustion air. The cooling structure allows combustion air for the engine to be cooled.

As an embodiment, the work vehicle further comprises
a water temperature sensor provided on the engine and configured to detect a temperature of engine cooling water,
wherein the first exhaust port faces the water temperature sensor.

This arrangement allows cooling air discharged through the first exhaust port to reach the water temperature sensor and thereby cool the water temperature sensor. This in turn provides a simple cooling structure that utilizes cooling air discharged from the belt-type continuously variable transmission device to cool the water temperature sensor. The cooling structure prevents the water temperature sensor from making a detection error as a result of a rise in the temperature of the water temperature sensor.

As an embodiment, the work vehicle further comprises
an ignition coil provided on the engine and configured to generate an ignition voltage for the engine,
wherein the first exhaust port faces the ignition coil.

This arrangement allows cooling air discharged through the first exhaust port to reach the ignition coil and thereby cool the ignition coil. This in turn provides a simple cooling structure that utilizes cooling air discharged from the belt-type continuously variable transmission device to cool the ignition coil. The cooling structure prevents a rise in the temperature of the ignition coil.

As an embodiment, the work vehicle further comprises an exhaust gas guiding part that protrudes upward from an upper portion of the transmission device case, that has the first exhaust port, and that is configured to guide the cooling air to the first exhaust port.

This arrangement allows cooling air to be discharged from the belt-type continuously variable transmission device at a position higher than the top portion of the transmission device case. This in turn allows cooling air discharged from the belt-type continuously variable transmission device to reach an upper portion of the engine, which tends to have a temperature higher than the temperature of a lower portion of the engine.

An embodiment is arranged such that the transmission device case has a second exhaust port which is present on the side of the exhaust pipe on which side the engine is present and through which the cooling air is discharged from inside the transmission device case in a direction in which the exhaust pipe extends.

This arrangement allows cooling air to be discharged through not only the first exhaust port but also the second exhaust port. This in turn allows cooling air to be discharged smoothly even if a change in the speed of the rotary fan has increased the amount of cooling air. Further, the second exhaust port allows cooling air to be discharged on a side of the exhaust pipe on which side the engine is present. This prevents cooling air discharged through the second exhaust port from easily becoming heated by the exhaust pipe.

As an embodiment, the work vehicle further comprises an exhaust gas guiding part that protrudes upward from an upper portion of the transmission device case, that has the first exhaust port and the second exhaust port, and that is configured to guide the cooling air to the first exhaust port and the second exhaust port.

This arrangement provides a simple structure including an exhaust gas guiding part commonly for the first exhaust port and the second exhaust port. This structure allows the first exhaust port and the second exhaust port to be higher in position than the top portion of the transmission device case.

DETAILED DESCRIPTION OF PREFERRED EMBODIMENTS

The description below deals with an example embodiment of the present invention with reference to drawings.

Figure 1:
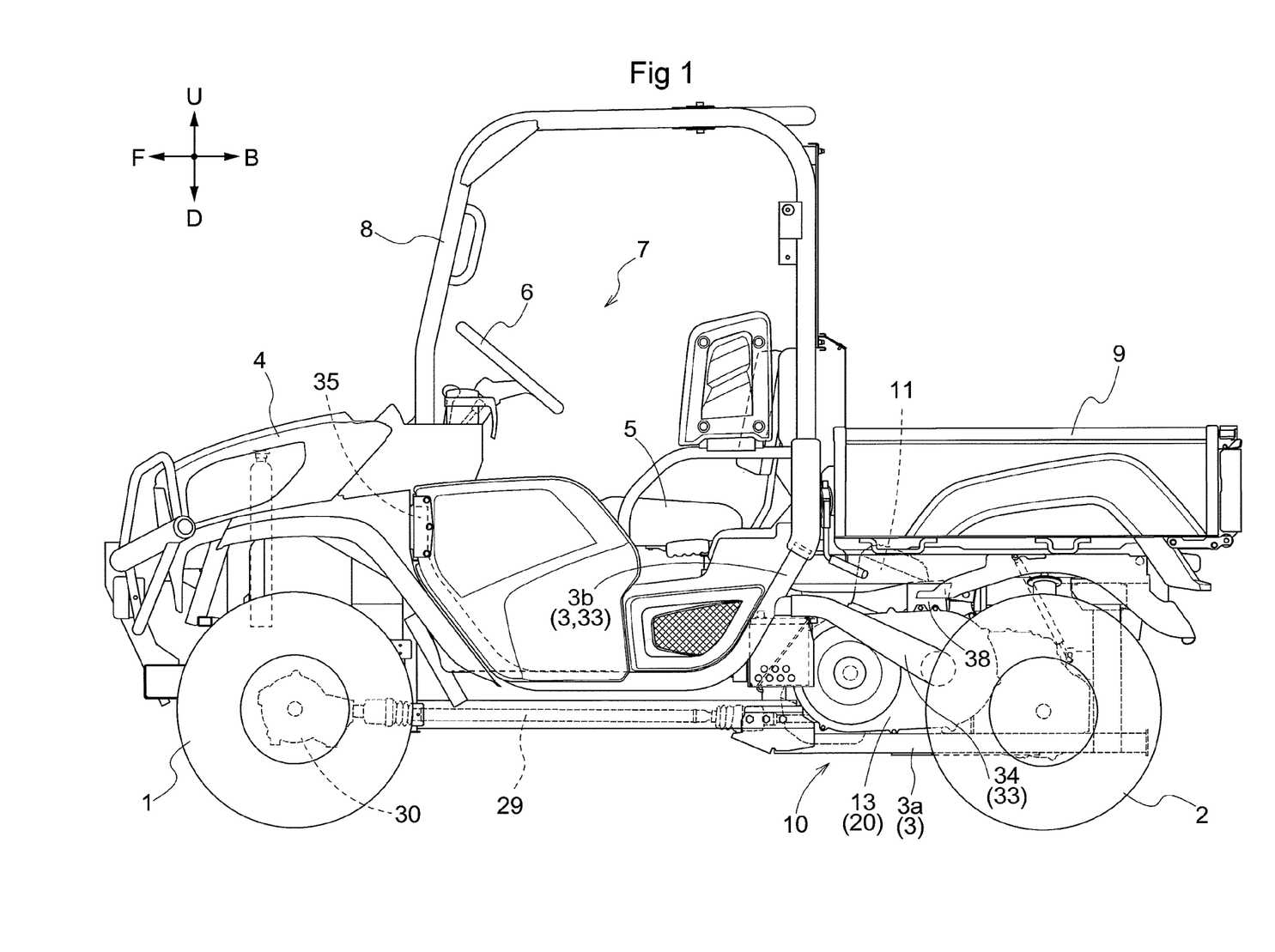
FIG. 1 is a left side view of a multipurpose work vehicle as a whole.

The description below is related to a traveling vehicle body of a multipurpose work vehicle as an example work vehicle. FIG. 1 shows a vehicle body whose forward direction is indicated with the arrow F, whose backward direction is indicated with the arrow B, whose upward direction is indicated with the arrow U, whose downward direction is indicated with the arrow D, whose leftward direction corresponds to the front side of the drawing, and whose rightward direction corresponds to the back side of the drawing.

[Overall Configuration of Multipurpose Work Vehicle]

As illustrated in FIG. 1, the multipurpose work vehicle includes a traveling vehicle body. The traveling vehicle body is provided with (i) a pair of left and right, steerable and drivable front wheels 1 as a traveling device and (ii) a pair of left and right, drivable rear wheels 2 as a traveling device. The multipurpose work vehicle also includes a body frame 3 as well as a front lid 4 at a front portion of the traveling vehicle body. The front lid 4 covers, for example, a front portion of the body frame 3. The multipurpose work vehicle includes a driving part 7 between the front wheels 1 and the rear wheels 2. The driving part 7 includes a driver's seat 5 and a steering wheel 6 for steering the front wheels 1. The driving part 7 is provided with a ROPS 8 present around the operator space. The body frame 3 has a rear portion provided with a cargo box 9. The multipurpose work vehicle includes, under the cargo box 9, (i) a motor part 10 including an engine 11 (see FIG. 2) and (ii) a power transmission part 20 for transmitting power from the engine 11 to the front wheels 1 and the rear wheels 2.

[Configuration of Motor Part]

Figure 2:
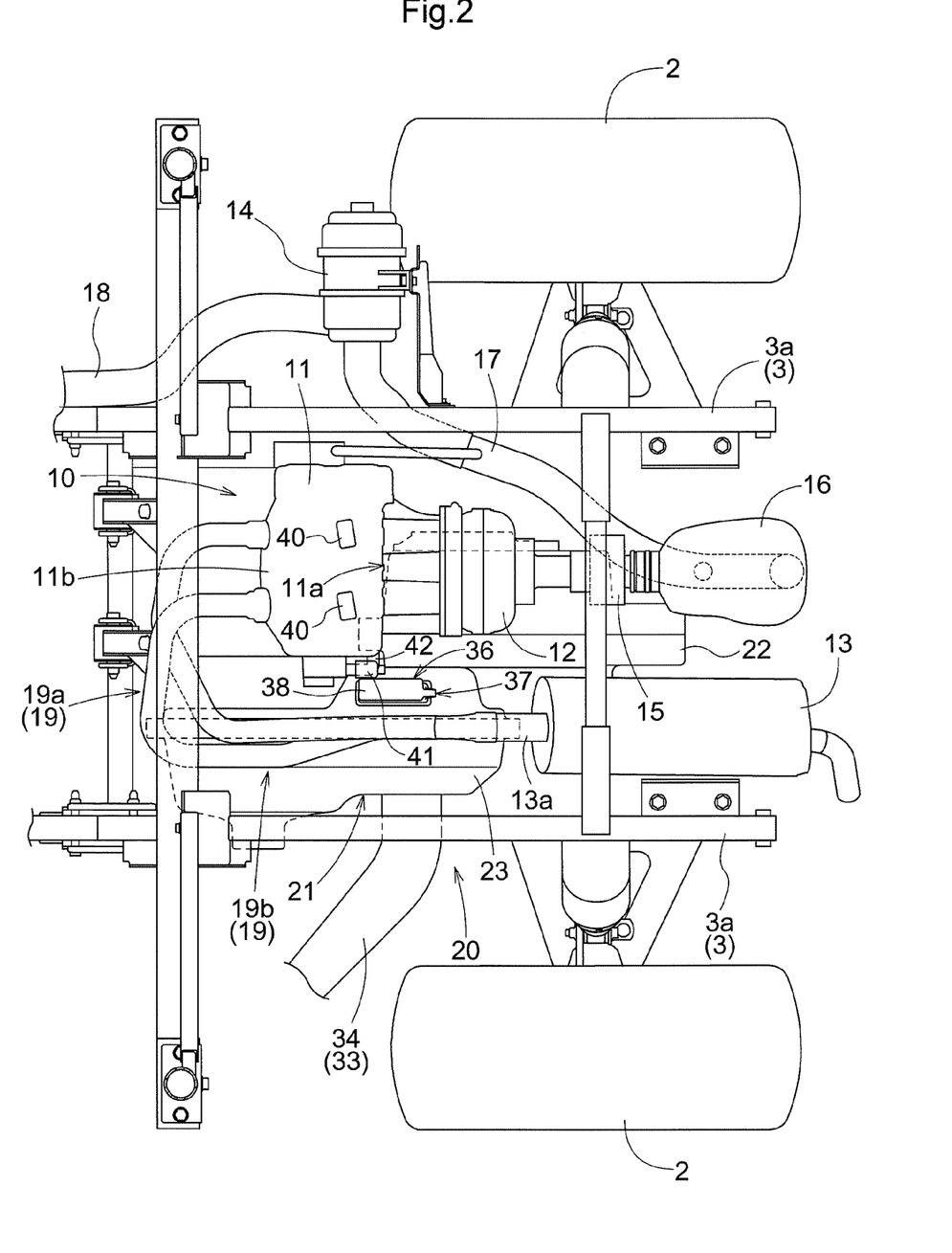
FIG. 2 provides a plan view of a motor part and a power transmission part.

The motor part 10, as illustrated in FIG. 2, includes an engine 11, an air supply device 12 for the engine, an exhaust muffler 13 for the engine, and an air cleaner 14 for the engine.

The engine 11 is located inward of a pair of left and right rear frame parts 3a in the left-right direction of the vehicle body, the rear frame parts 3a being parts of the body frame 3 that are located rearward. The engine 11 includes an intake part 11a at a rear portion thereof. The intake part 11a is connected with a front portion of the air supply device 12. The air supply device 12 has a rear portion connected with a resonator 16 with a throttle valve 15 therebetween. The resonator 16 includes an intake part connected with a discharge part of the air cleaner 14 through a first intake pipe 17. The air cleaner 14 includes an intake part provided with a second intake pipe 18 extending forward to a position inside the front lid 4. The engine 11 produces a suction force that sucks air inside the front lid 4 (see FIG. 1) through the second intake pipe 18 into the air cleaner 14. The air cleaner 14 then removes dust from the air. The air, from which dust has been removed, is introduced through the first intake pipe 17 into the resonator 16. While the resonator 16 reduces the suction noise, the air is then introduced through the throttle valve 15 into the air supply device 12. The air supply device 12 supplies the air to the engine 11 as combustion air.

Figure 4:
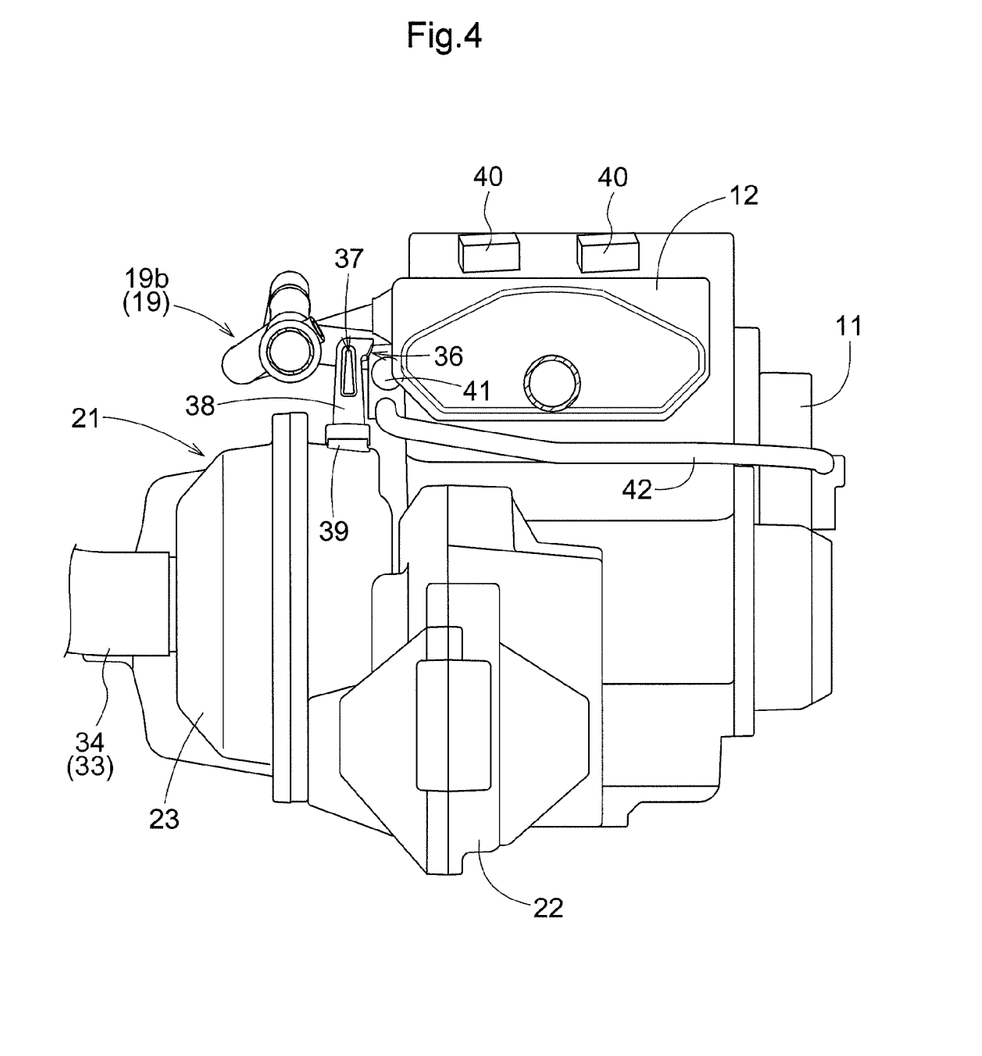
FIG. 4 provides a rear view of a first exhaust port and a second exhaust port.

As illustrated in FIGS. 2 and 4, the engine 11 has an upper portion provided with two ignition coils 40 configured to generate an ignition voltage for the engine 11. The upper portion of the engine 11 has a lateral side portion provided with a water temperature sensor 41. The water temperature sensor 41 is configured to measure the temperature of engine cooling water running through a cooling water circulation conduit 42 connected with the engine 11.

As illustrated in FIG. 2, the exhaust muffler 13 is located backward and leftward of the engine 11. The exhaust muffler 13 includes an intake part 13a connected through an exhaust pipe 19 with an exhaust part 11b of the engine 11 that is located at a front portion of the engine 11. The engine 11 discharges exhaust gas through the exhaust pipe 19 into the exhaust muffler 13. While the exhaust muffler 13 reduces the exhaust noise, the exhaust gas is discharged into the atmosphere.

Figure 3:
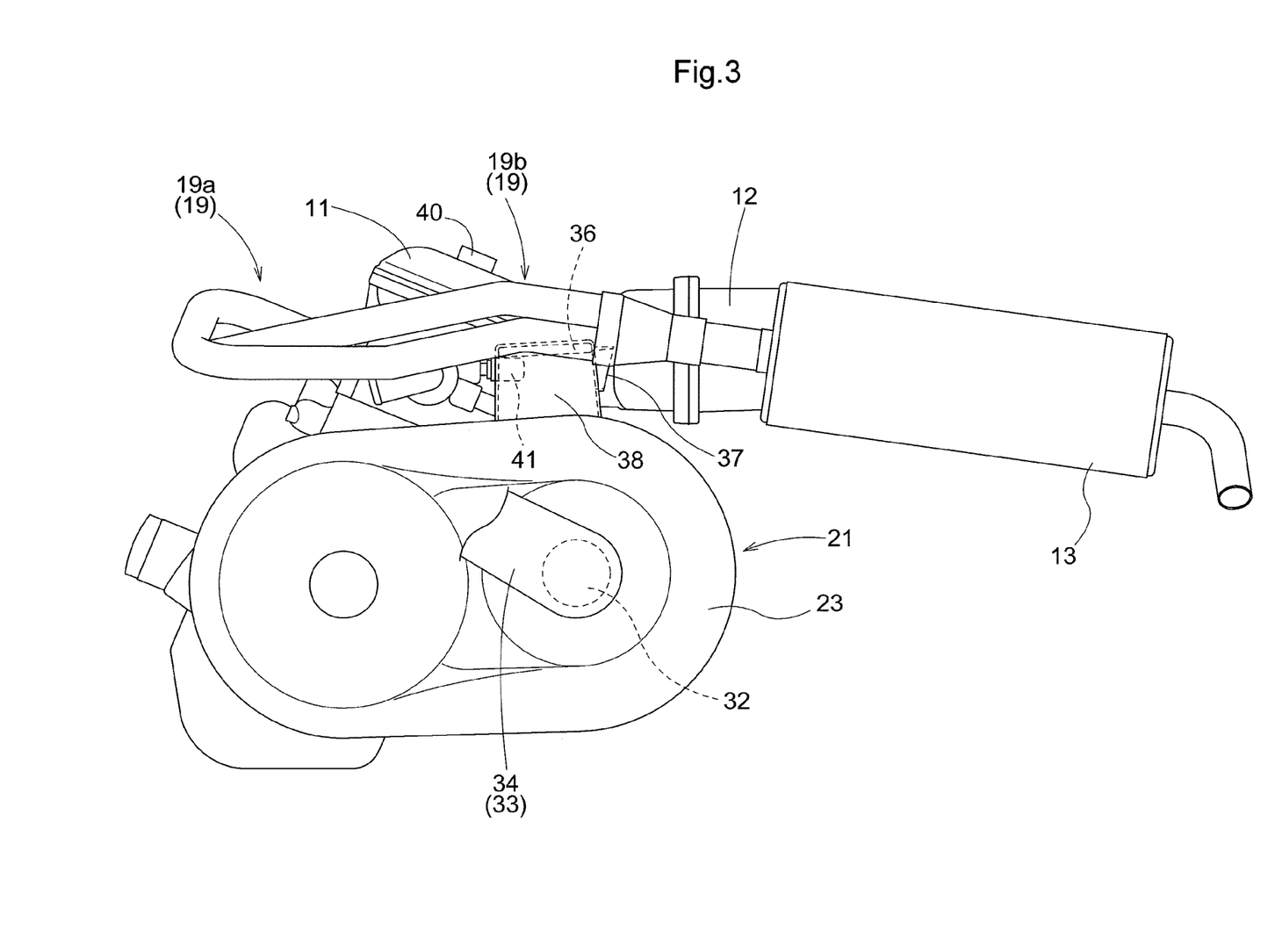
FIG. 3 provides a side view of a belt-type continuously variable transmission device and an exhaust pipe.

The exhaust pipe 19, as illustrated in FIGS. 2 and 3, includes an upstream exhaust pipe portion 19a and a downstream exhaust pipe portion 19b. The upstream exhaust pipe portion 19a extends from the exhaust part 11b of the engine 11 to a position upward of a front portion of a belt-type continuously variable transmission device 21 provided on a lateral side of the engine 11. The upstream exhaust pipe portion 19a is made up of a front portion of each of two exhaust pipe members extending from the exhaust part 11b of the engine 11 to a position upstream of the intake part 13a of the exhaust muffler 13. The downstream exhaust pipe portion 19b extends in the front-rear direction above the belt-type continuously variable transmission device 21. The downstream exhaust pipe portion 19b connects the upstream exhaust pipe portion 19a with the intake part 13a of the exhaust muffler 13. The downstream exhaust pipe portion 19b is made up of (i) a rear portion of each of the two exhaust pipe members and (ii) a single connecting pipe connecting the respective rear end portions of the two exhaust pipe members with the intake part 13a of the exhaust muffler 13.

(Configuration of Power Transmission Part)

The power transmission part 20, as illustrated in FIGS. 1 and 2, includes (i) a belt-type continuously variable transmission device 21 provided on a lateral side of the engine 11 and (ii) a traveling transmission device 22 located backward and downward of the engine 11.

Figure 5:
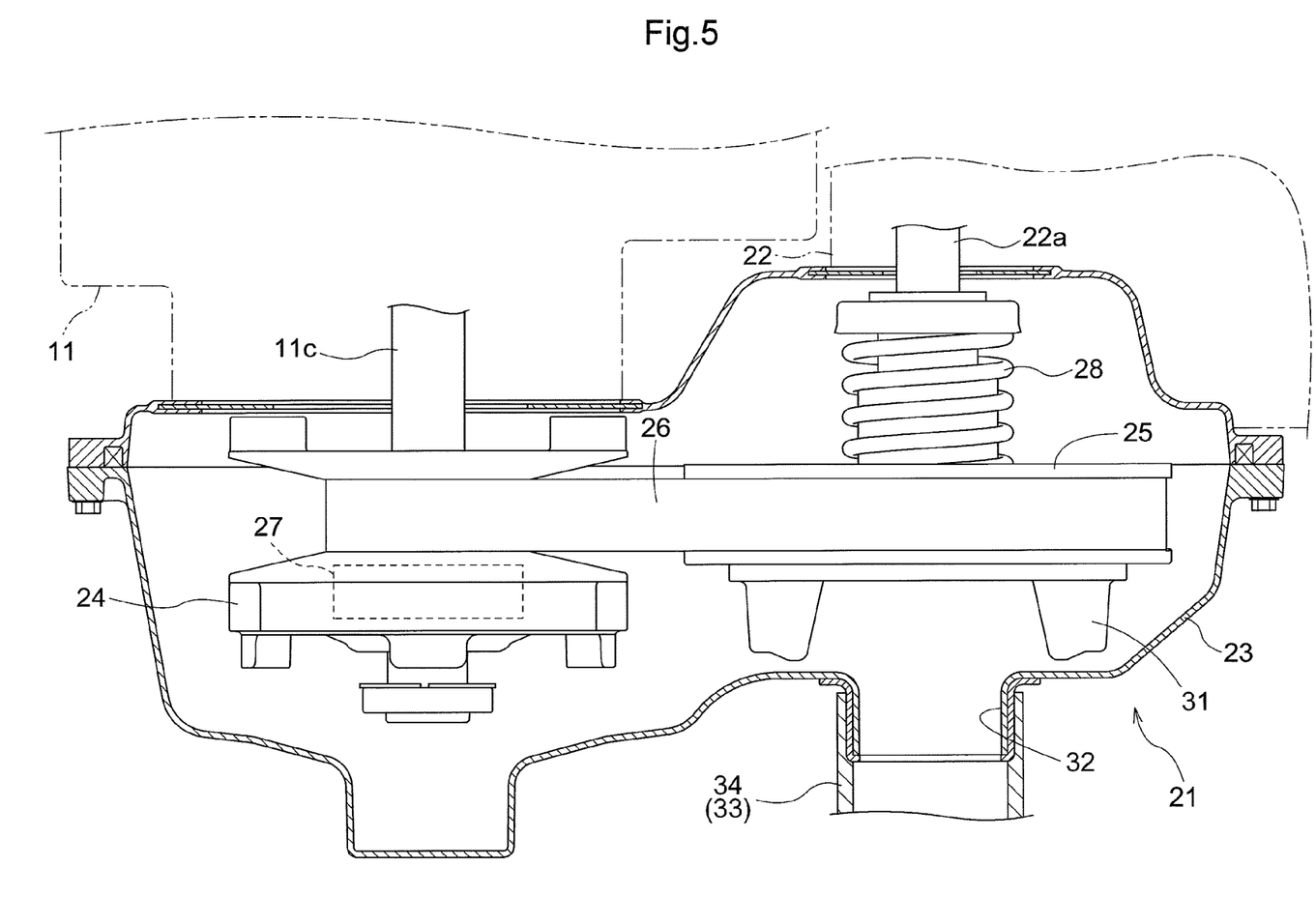
FIG. 5 is a cross-sectional plan view of a belt-type continuously variable transmission device.

The belt-type continuously variable transmission device 21, as illustrated in FIG. 5, includes a transmission device case 23. The transmission device case 23 contains a belt pulley 24, a belt pulley 25, and an endless belt 26. The belt pulley 24 is supported in such a manner as to be incapable of rotation relative to the output shaft 11c of the engine 11. The belt pulley 25 is located backward of the belt pulley 24. The endless belt 26 is wound around the belt pulley 24 and the belt pulley 25. The belt pulley 25 is supported in such a manner as to be incapable of rotation relative to the input shaft 22a of the traveling transmission device 22. The belt pulley 24 and the belt pulley 25 each include a pair of half pulley bodies. This allows each of the belt pulley 24 and the belt pulley 25 to have an adjustable belt winding diameter. One of the half pulley bodies of the belt pulley 24 is provided with a pulley diameter adjustment mechanism 27 that allows the belt winding diameter of the belt pulley 24 to be adjusted. One of the half pulley bodies of the belt pulley 25 is provided with a spring 28 configured to urge the belt pulley 25 to increase its belt winding diameter.

The belt-type continuously variable transmission device 21 is configured to receive power from the engine 11 and output the power to the front wheels 1 and the rear wheels 2 while varying the power non-stepwise.

Specifically, the belt-type continuously variable transmission device 21 is configured as follows: The belt pulley 24 receives power from the engine 11 via the output shaft 11c and is thereby driven. The belt pulley 24 transmits its power via the endless belt 26 to the belt pulley 25 to drive the belt pulley 25. The belt pulley 25 outputs its power via the input shaft 22a to the traveling transmission device 22. Operating the pulley diameter adjustment mechanism 27 allows the belt winding diameter of the belt pulley 24 to be adjusted. This operation causes the belt winding diameter of the belt pulley 25 to be (i) decreased as a result of the endless belt 26 pressing the belt pulley 25 or (ii) increased as a result of the spring 28 increasing the belt winding diameter. This allows the power from the engine 11 to be transmitted from the belt pulley 25 to the input shaft 22a in the form of power with a steplessly variable rotation speed.

The traveling transmission device 22 is configured as follows: The input shaft 22a receives power from the belt pulley 25 of the belt-type continuously variable transmission device 21. The input shaft 22a transmits its power to a rear-wheel differential mechanism (not shown in the drawings). The rear-wheel differential mechanism then transmits the power to the left and right rear wheels 2. The input shaft 22a also transmits its power to a front-wheel output shaft (not shown in the drawings). The front-wheel output shaft then transmits the power to a rotary shaft 29 (see FIG. 1). The rotary shaft 29 transmits its power to a front-wheel differential mechanism (not shown in the drawings) contained in a front-wheel drive case 30 (see FIG. 1). The front-wheel differential mechanism then transmits the power to the left and right front wheels 1.

[Arrangement for Cooling Belt-Type Continuously Variable Transmission Device and Motor Part]

As illustrated in FIG. 5, the transmission device case 23 contains a rotary fan 31. The rotary fan 31 is integrated with one of the half pulley bodies of the belt pulley 25, and is driven by the belt pulley 25. As illustrated in FIGS. 3 and 5, the transmission device case 23 has an intake port 32. The intake port 32 is present in the transmission device case 23 at such a position as to face the rotary fan 31. This allows a suction force generated by rotation of the rotary fan 31 to easily reach the intake port 32. The intake port 32 is fitted with an intake duct 33. The intake duct 33 is, as illustrated in FIG. 1, made up of a driving-part frame part 3b and a communication duct 34. The driving-part frame part 3b is that part of the body frame 3 which corresponds to the driving part 7. The communication duct 34 allows for communication between a rear end portion of the driving-part frame part 3b and the intake port 32. The driving-part frame part 3b includes a steel pipe. The driving-part frame part 3b is utilized as the intake duct 33. The driving-part frame part 3b includes a front end portion having an inlet 35 through which cooling air is introduced into the driving-part frame part 3b. The inlet 35 is located inside the front lid 4.

As illustrated in FIGS. 2, 3, and 4, the transmission device case 23 has a first exhaust port 36 and a second exhaust port 37. The first exhaust port 36 is present on a side of the exhaust pipe portion 19b (which extends in the front-rear direction above the transmission device case 23) on which side the engine 11 is present. The first exhaust port 36 faces the engine 11. The second exhaust port 37 is present on the side of the exhaust pipe portion 19b on which side the engine 11 is present. The second exhaust port 37 protrudes backward in the direction in which the exhaust pipe portion 19b extends.

Specifically, the transmission device case 23 is designed as illustrated in FIGS. 3 and 4. The transmission device case 23 includes an upper portion provided with an exhaust gas guiding part 38 protruding upward. The inside of the exhaust gas guiding part 38 communicates with the inside of the transmission device case 23 via a communication port 39 in the transmission device case 23. The exhaust gas guiding part 38 includes a side wall portion facing the engine 11 and the air supply device 12, the side wall portion having an upper end portion with a first exhaust port 36. The first exhaust port 36 faces a lateral side portion of the engine 11, a lateral side portion of the air supply device 12, and the water temperature sensor 41. The first exhaust port 36 is higher in position than the top portion of the transmission device case 23. The exhaust pipe portion 19b is behind the first exhaust port 36. The exhaust gas guiding part 38 includes a rear wall portion having an upper end portion with a second exhaust port 37.

The rotary fan 31 is rotated to generate a suction force, thereby sucking air outside the transmission device case 23 (that is, air inside the front lid 4) through the intake duct 33 and the intake port 32 into the transmission device case 23. This generates cooling air inside the transmission device case 23. The cooling air thus generated cools the belt-type continuously variable transmission device 21. The rotation of the rotary fan 31 also generates a blowing force, thereby causing the cooling air after the cooling to travel through the communication port 39 into the exhaust gas guiding part 38. The exhaust gas guiding part 38 then guides the cooling air to the first exhaust port 36 and the second exhaust port 37. The cooling air having been guided to the first exhaust port 36 is discharged through the first exhaust port 36 toward the engine 11, the air supply device 12, and the water temperature sensor 41 to reach the engine 11, the air supply device 12, and the water temperature sensor 41. The cooling air thereby cools (i) the engine 11, (ii) combustion air supplied by the air supply device 12 to the engine 11, and (iii) the water temperature sensor 41. The first exhaust port 36 is on the side of the exhaust pipe portion 19b on which side the engine 11 is present, and the exhaust pipe portion 19b is behind the first exhaust port 36. This allows cooling air from the first exhaust port 36 to reach the engine 11, the air supply device 12, and the water temperature sensor 41 without becoming heated by the exhaust pipe portion 19b. The cooling air having been guided to the second exhaust port 37 is discharged backward through the second exhaust port 37, and is thereby discharged backward of the traveling vehicle body while the cooling air does not easily become heated by the exhaust pipe portion 19b.

[Other Embodiments]

Figure 6:
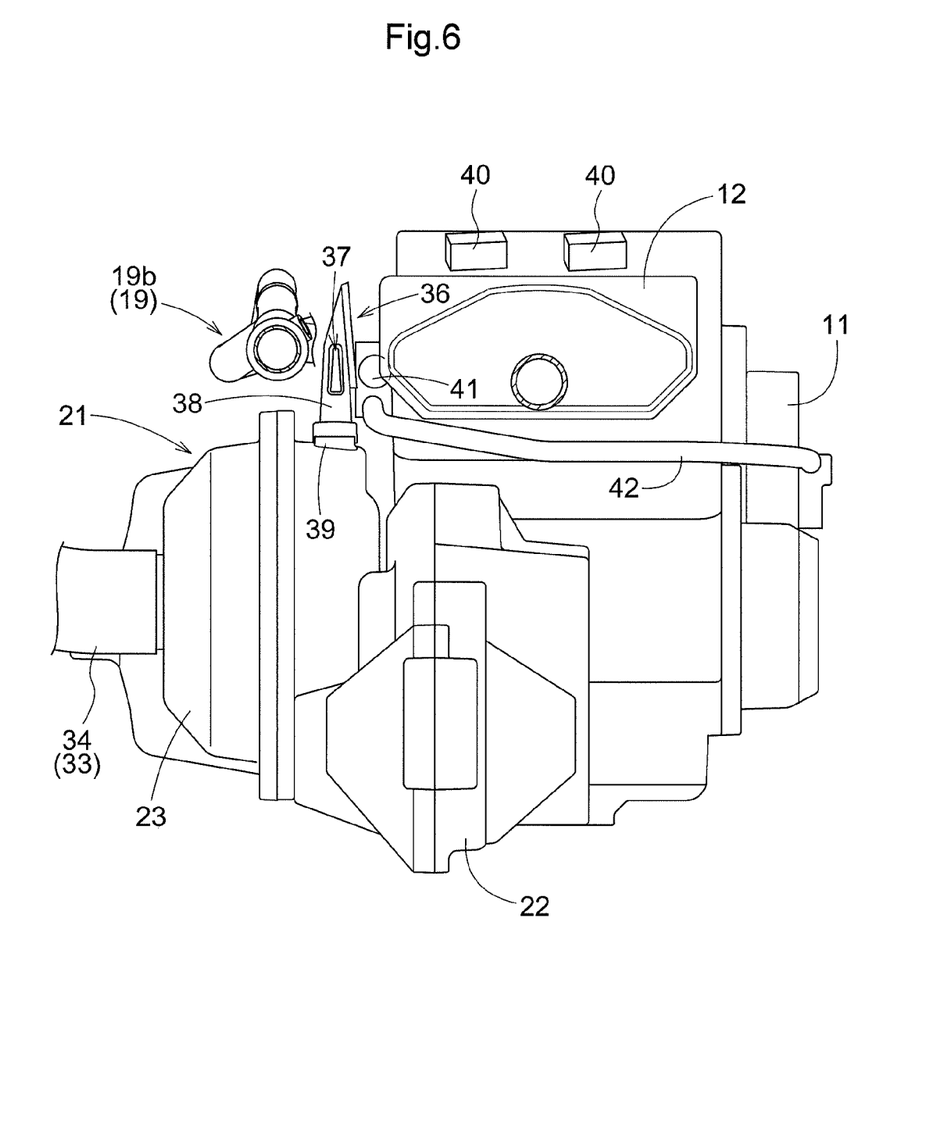
FIG. 6 provides a rear view of an exhaust gas guide for another embodiment.

(1) FIG. 6 provides a rear view of an exhaust gas guiding part 38 for another embodiment. The exhaust gas guiding part 38 for the other embodiment has a first exhaust port 36 that faces not only the engine 11, the air supply device 12, and the water temperature sensor 41 but also the ignition coils 40 to be capable of discharging cooling air toward the ignition coils 40 as well.

(2) The embodiment described above as an example is arranged such that the rotary fan 31 is integrated with the belt pulley 25. The present invention is, however, not limited to such an arrangement. The present invention may alternatively include, for example, a rotary fan integrated with the belt pulley 24 or a rotary fan as a member separate from the belt pulley 25 and the belt pulley 24.

(3) The embodiment described above as an example includes an exhaust gas guiding part 38. The present invention is, however, not limited to such an arrangement. The present invention may alternatively be arranged such that the first exhaust port 36 and the second exhaust port 37 are present in the transmission device case 23 itself.

(4) The embodiment described above as an example is arranged such that the first exhaust port 36 discharges cooling air toward the engine 11, the air supply device 12, and the water temperature sensor 41. The present invention is, however, not limited to such an arrangement. The present invention may alternatively be arranged such that the first exhaust port 36 discharges cooling air toward the engine 11 only.

(5) The embodiment described above as an example includes a second exhaust port 37. The present invention may, however, alternatively not have a second exhaust port 37.

(6) The embodiment described above as an example is arranged such that the driving-part frame part 3b is utilized as the intake duct 33. The present invention may, however, alternatively or additionally include a dedicated intake duct as a separate member.

(7) The embodiment described above as an example includes front wheels 1 and rear wheels 2. The present invention is, however, not limited to such an arrangement. The present invention may alternatively include a crawler traveling device or a traveling device including wheels and semi-crawler belts.

(8) The work vehicle is not limited to a multipurpose work vehicle, and may alternatively be a different type of work vehicle such as a rice transplanter or a tractor.

What is claimed is:

1. A work vehicle, comprising:
an engine;
a belt-type continuously variable transmission device provided on a lateral side of the engine and configured to (i) receive power from the engine and (ii) output the power to a traveling device while varying the power in terms of speed, the belt-type continuously variable transmission device including:
a transmission device case containing a belt pulley and an endless belt wound around the belt pulley;
a rotary fan provided inside the transmission device case;
an intake port which is present in the transmission device case and through which cooling air is sucked from outside the transmission device case into the transmission device case as a result of rotation of the rotary fan; and
a first exhaust port which is present in the transmission device case and through which the cooling air is discharged from inside the transmission device case as a result of the rotation of the rotary fan; and
an exhaust pipe extending in a front-rear direction above the belt-type continuously variable transmission device and configured to discharge exhaust gas from the engine,
wherein the first exhaust port is present on a side in a left-right direction of the exhaust pipe on which side the engine is present, and faces the lateral side of the engine.

2. The work vehicle according to claim 1, wherein the first exhaust port faces a lateral side portion of the engine.

3. The work vehicle according to claim 1, further comprising:
an air supply device connected with a rear portion of the engine and configured to supply combustion air to the engine,
wherein the first exhaust port faces a lateral side portion of the air supply device.

4. The work vehicle according to claim 1, further comprising:
a water temperature sensor provided on the engine and configured to detect a temperature of engine cooling water,
wherein the first exhaust port faces the water temperature sensor.

5. The work vehicle according to claim 1, further comprising:
an ignition coil provided on the engine and configured to generate an ignition voltage for the engine,
wherein the first exhaust port faces the ignition coil.

6. The work vehicle according to claim 1, further comprising:
   an exhaust gas guiding part that protrudes upward from an upper portion of the transmission device case, that has the first exhaust port, and that is configured to guide the cooling air to the first exhaust port.

7. The work vehicle according to claim 1, wherein
   the transmission device case has a second exhaust port which is present on the side of the exhaust pipe on which side the engine is present and through which the cooling air is discharged from inside the transmission device case in a direction in which the exhaust pipe extends.

8. The work vehicle according to claim 7, further comprising:
   an exhaust gas guiding part that protrudes upward from an upper portion of the transmission device case, that has the first exhaust port and the second exhaust port, and that is configured to guide the cooling air to the first exhaust port and the second exhaust port.

* * * * *